(12) United States Patent
Sengupta et al.

(10) Patent No.: US 12,371,261 B1
(45) Date of Patent: Jul. 29, 2025

(54) AUTOMATED PACKAGE LOADING SYSTEMS

(71) Applicant: Amazon Technologies, Inc., Seattle, WA (US)

(72) Inventors: Mainak Sengupta, Medford, MA (US); Talha Hasan, Redmond (GB); Rahul Banerjee, Andover, MA (US)

(73) Assignee: Amazon Technologies, Inc., Seattle, WA (US)

( * ) Notice: Subject to any disclaimer, the term of this patent is extended or adjusted under 35 U.S.C. 154(b) by 988 days.

(21) Appl. No.: 17/400,423

(22) Filed: Aug. 12, 2021

(51) Int. Cl.
| | | |
|---|---|---|
| *B65G 1/10* | (2006.01) | |
| *B25J 5/02* | (2006.01) | |
| *B25J 9/16* | (2006.01) | |
| *B65G 47/90* | (2006.01) | |
| *B66F 9/06* | (2006.01) | |
| *B66F 9/12* | (2006.01) | |

(52) U.S. Cl.
CPC .............. *B65G 1/10* (2013.01); *B25J 5/02* (2013.01); *B25J 9/1679* (2013.01); *B65G 47/902* (2013.01); *B66F 9/063* (2013.01); *B66F 9/12* (2013.01); *B65G 2203/0208* (2013.01); *B65G 2203/041* (2013.01)

(58) Field of Classification Search
CPC .............. B65G 1/10; B65G 47/902; B65G 2203/0208; B65G 2203/041; B25J 5/02; B25J 9/1679; B66F 9/063; B66F 9/12
See application file for complete search history.

(56) References Cited

U.S. PATENT DOCUMENTS

| | | | | |
|---|---|---|---|---|
| 4,046,394 | A * | 9/1977 | Thompson, Jr. .......... | B62B 3/14 |
| | | | | 280/33.993 |
| 6,385,508 | B1 * | 5/2002 | McGee ................ | G05B 19/423 |
| | | | | 700/86 |
| 7,161,322 | B2 * | 1/2007 | Wang ...................... | B25J 5/007 |
| | | | | 901/6 |
| 7,313,464 | B1 * | 12/2007 | Perreault ................ | B25J 9/1666 |
| | | | | 700/262 |
| 8,925,405 | B2 * | 1/2015 | Kawabuchi .............. | B25J 9/045 |
| | | | | 74/37 |
| 9,731,896 | B2 * | 8/2017 | Elazary ................... | B66F 9/063 |
| 10,350,014 | B2 * | 7/2019 | Beelen ................... | A61B 34/74 |
| 10,549,928 | B1 * | 2/2020 | Chavez ................ | B65G 47/905 |
| 10,994,872 | B2 * | 5/2021 | Mattern ............... | G06Q 10/087 |
| 11,007,648 | B2 * | 5/2021 | Wertenberger ........ | B25J 9/1697 |
| 11,014,226 | B2 * | 5/2021 | Stroud .................... | B25J 15/009 |
| 11,590,659 | B2 * | 2/2023 | Peterson ................. | B07C 5/362 |
| 11,607,804 | B2 * | 3/2023 | Rembisz ................ | B25J 19/022 |
| 2003/0010603 | A1 * | 1/2003 | Corrigan .............. | B65G 47/846 |
| | | | | 198/474.1 |

(Continued)

FOREIGN PATENT DOCUMENTS

| | | | | |
|---|---|---|---|---|
| CN | 108568840 | A * | 9/2018 | |
| CN | 111776557 | B * | 3/2022 | ............... B65G 1/04 |

*Primary Examiner* — Thomas Randazzo
(74) *Attorney, Agent, or Firm* — Eversheds Sutherland (US) LLP

(57) ABSTRACT

Systems and methods are disclosed to automatically load packages into containers. In one embodiment, an example system may include a robotic platform configured to elevate and rotate a container to a predetermined orientation, and a robotic manipulator configured to retrieve a first package from a surface and to position the first package inside the container at a predetermined position.

18 Claims, 11 Drawing Sheets

(56) References Cited

U.S. PATENT DOCUMENTS

| | | | |
|---|---|---|---|
| 2020/0130933 A1* | 4/2020 | Mattern | B25J 19/0054 |
| 2020/0283229 A1* | 9/2020 | Edwards | G05D 1/0297 |
| 2022/0242684 A1* | 8/2022 | Latvys | B66F 9/04 |

* cited by examiner

AUTOMATED PACKAGE LOADING SYSTEMS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that throughput can be increased and sustainability can be improved.

Figure 1:
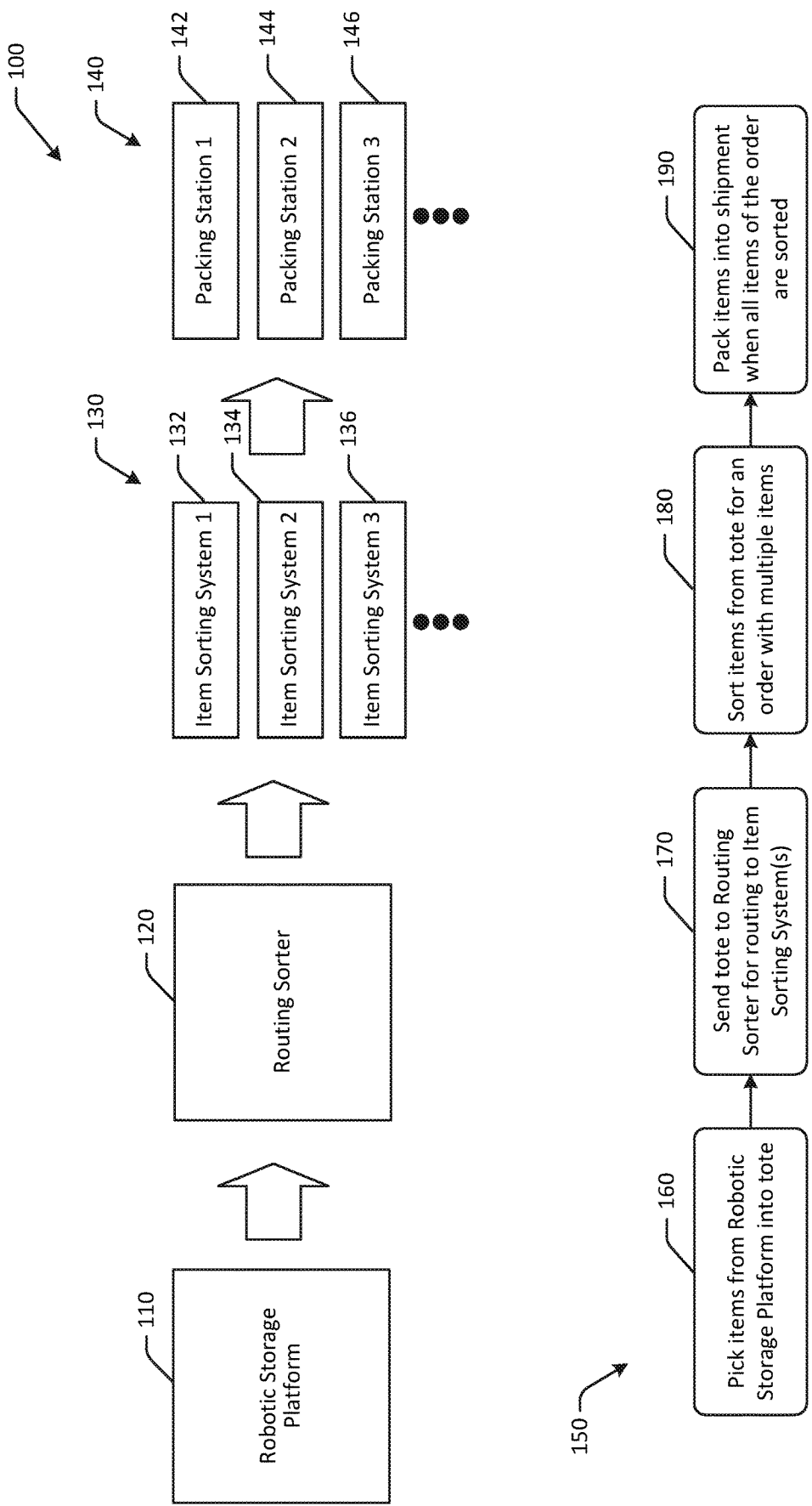
FIG. 1 is a hybrid schematic illustration of an example use case for automated package loading systems and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products and/or shipping of packages in an order may be time consuming.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. However, directing picked products to the appropriate packing station and/or location may form a bottleneck in the operation of the fulfillment center. For example, after products are picked, the products may be placed in a container, such as a tote or other container, and directed to sortation machines to direct the picked products to the appropriate packing location. For example, products in the same order may be directed to the same packing location for consolidation and subsequent packing. However, a tote or other container may include products that are to be sorted to multiple different packing locations, and the sortation process may be slowed by sheer volume of products that are to be processed and/or sorted.

In addition, once items are packed into packages for shipping, such packages may be processed for delivery to a user, where such processes may include sortation of labeled packages, and so forth. Depending on the type of item and/or the number of items inside a package, packages may have different sizes and weights. As such packages are sorted or otherwise moved throughout facilities, the packages may be handled by robots or machines in some instances, such as conveyors, diverters, and so forth. At times, packages may be aggregated into containers, such as carts, boxes, Gaylords, pallets, and/or other containers. For example, packages destined for a similar destination may be aggregated into a cart for shipment.

Some systems may use moveable carts as containers to receive packages that are deposited down a ramp, chute, or other surface. Such moveable carts may be configured to roll (e.g., an operator may manually push or pull the moveable cart, etc.) and/or be lifted from a bottom surface or otherwise transported by a robot. The carts or other containers may have doors that swing outwards to open and close. Loading packages into such carts, or into other types of containers (e.g., pallets, Gaylords, etc.), may be time-consuming and cumbersome. For example, the cart doors may have to be opened in order to load packages into a cart. Cart utilization may also be suboptimal when filled manually.

Embodiments of the disclosure include automated package loading systems that are configured to load packages into containers, such as carts and other containers, automatically. Some embodiments use cameras or other perception systems, such as lidar and other types of sensors, to determine optimal package placement to load containers without requiring manual intervention. Certain embodiments use separate hardware to rotate containers and to position packages, thereby reducing overall costs associated with the system. Hardware used to handle packages may be limited to three degrees of freedom, resulting in reduced hardware costs. Some embodiments may maintain or improve manual load utilization (e.g., the percentage of an individual container that is actually filled, etc.) of containers. In addition, certain embodiments may fill containers relatively faster than manual effort. Embodiments may therefore load packages into containers automatically. As a result, throughput of fulfillment centers may be improved, and/or logistics of fulfillment center operations may be less complicated.

Referring to FIG. 1, an example use case 100 for automated package loading systems and an example process flow in accordance with one or more embodiments of the disclosure. Although discussed in the context of online orders, other embodiments may be directed to any suitable use case where products are picked and sorted, or packages are sorted, such as instances where users may pick up orders rather than receiving a shipment.

In FIG. 1, a fulfillment center may include a robotic storage platform 110, a routing sorter 120, one or more item sorting systems 130, and one or more packing stations 140. The robotic storage platform 110 may be a portion of the fulfillment center at which products picked from product inventory are placed. Robots may be used to pick products from inventory and to deliver to the robotic storage platform in some instances, while in other instances, manual effort or a combination thereof may be used to pick products. The picking process at the robotic storage platform may include locating a product in an order, obtaining the product, and sending the product to the robotic storage platform 110, such as via a conveyor belt. In the illustrated embodiment, products at the robotic storage platform 110 may be placed in a container, such as a tote. The tote may be assigned to, or otherwise associated with, a particular item sorting system machine. For example, a certain tote may be associated with a certain item sorting system, such that products that are designated to be picked and placed in the tote are for orders that are to be consolidated at that particular item sorting system. The association between the tote and the item sorting system may optionally be static.

At the routing sorter 120, totes including products that have been picked may be routed to the appropriate or designated item sorting system. For example, the routing sorter 120 may determine an identifier associated with the tote, and may determine one or more item sorting systems to which the tote is to be routed using the identifier. The routing sorter 120 may route or direct the tote to the appropriate item sorting system.

The item sorting systems 130 may include one or more item sorting system machines. In FIG. 1, a first item sorting system 132, a second item sorting system 134, a third item sorting system 136, and so forth may be included. Any number of item sorting systems may be included. Some or all of the item sorting systems may optionally be associated with certain totes. The item sorting systems may be used to consolidate or otherwise aggregate products for multi-item orders. For example, a first tote may include a first item of a multi-item order, and a second tote may include a second item of the multi-item order. The item sorting system may therefore identify the orders associated with the respective products in a tote, and may transport the products to a container, such as a flexible container, associated with the order. When the order is complete with all of the products in the associated flexible container, the order may be packed. Accordingly, a specific item sorting system may be designated for fulfillment of a particular multi-item order. As a result, all of the products in the multi-item order may be placed in totes that are directed to that particular item sorting system. At the item sorting systems 130, totes that are received via the routing sorter 120 may be emptied, and the products in the respective totes may be transported to the appropriate flexible containers for the orders for which the products were picked.

After a multi-item order is complete (e.g., the item sorting system has delivered all of the products in the order to the appropriate flexible container, etc.), the order may be packed at the packing station 140. In some embodiments, one or more packing stations may be included. In some instances, a packing station may service more than one item sorting system, while in other instances, more than one packing station may service one item sorting system. In the illustration of FIG. 1, a first packing station 142 may be used to pack orders from the first item sorting system 132, a second packing station 144 may be used to pack orders from the second item sorting system 134, a third packing station 146 may be used to pack orders from the third item sorting system 136, and so forth. At the packing stations 140, the orders may be placed into boxes and sealed for subsequent shipment. The packages may then be processed for shipment to the user. Packages may be aggregated into moveable carts and/or may otherwise be transported using moveable carts as described herein. In some embodiments, moveable carts may be used to transport items in addition to, or instead of, packages.

At the fulfillment center, an example process flow 150 illustrated in FIG. 1 may be implemented to improve the efficiency and/or throughput of the fulfillment center. At a first block 160, items may be picked from the robotic storage platform 110 into a tote that may optionally be associated with a specific item sorting system. At a second block 170, the tote may be sent to the routing sorter 120 for routing to an item sorting system. At a third block 180, the items from the tote may be sorted for an order with multiple item by the specific item sorting system. At a fourth block 190, the items may be packed into a shipment when all of the items in the order are sorted.

Figure 2:
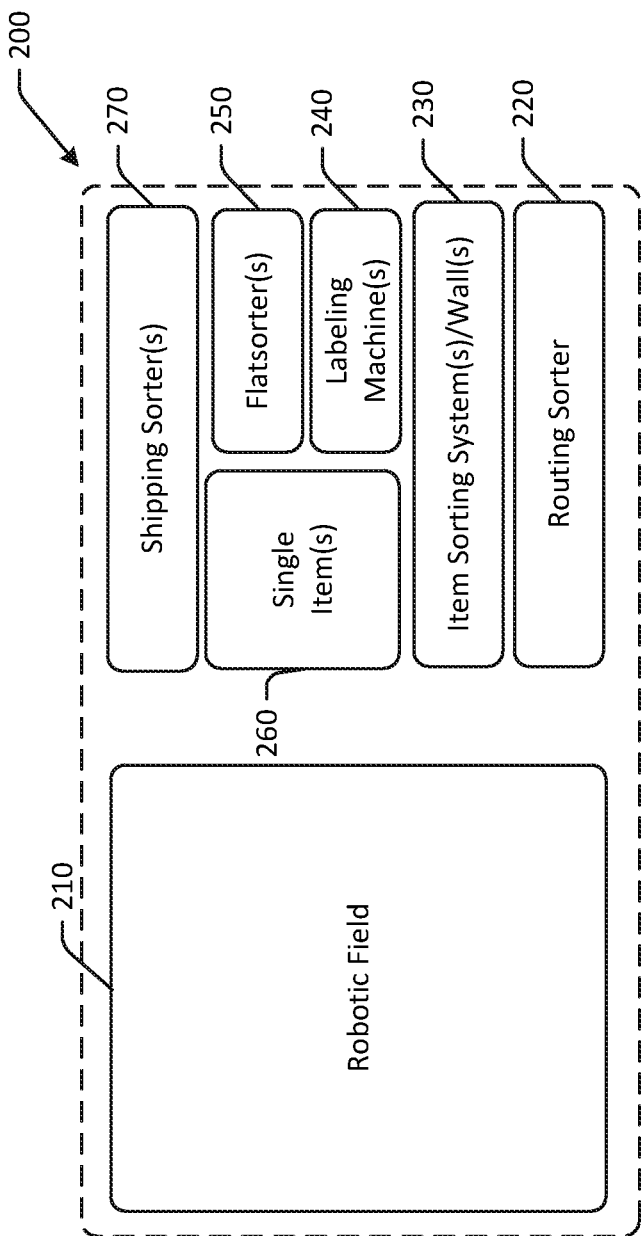
FIG. 2 is a hybrid schematic illustration of an example use case for automated package loading systems in accordance with one or more embodiments of the disclosure.

FIG. 2 is a hybrid schematic illustration of an example use case for automated package loading systems in accordance with one or more embodiments of the disclosure. Other embodiments may include additional or fewer components.

In FIG. 2, an example layout of a fulfillment center 200 is depicted. The fulfillment center 200 may include a robotic field 210 at which product inventory may be stored for picking, one or more routing sorters 220 that may be used to direct totes or other containers to item sorting systems, one or more item sorting systems or walls 230 used to consolidate products for multi-item orders and/or to pack multi-item orders, one or more single item sections 260 that may be used to pack single item orders, one or more labeling machines 240 that may be used to apply shipping labels to packages, one or more flat sorters 250 and shipping sorters 270 (e.g., package sortation system, etc.) to sort labeled shipments (e.g., by destination, carrier, etc.) for pickup from the fulfillment center 200.

In some embodiments, the item sorting systems described herein may be a part of the flat sorters 250, where the item sorting systems may be configured to sort packages into moveable carts using chutes or surfaces. In such embodiments, the item sorting systems may or may not also be used at the item sorting systems 230 portion of the fulfillment center 200. Accordingly, the item sorting systems may be disposed at, or otherwise coupled to, a cross belt conveyor system, such as the flat sorters 250 of the fulfillment center 200.

The item sorting system machines 230 may include containers of different sizes (e.g., small, medium, large, etc.) and may be configured, in one example, to handle items that weigh up to twenty or more pounds (e.g., 100 pounds or more, etc.). In some embodiments, the item sorting system machines 230 may include multiple chutes or surfaces, such as about 328 chutes, and may be configured to sort items at a rate of about 2,100 units per hour. In some instances, the item sorting system machines 230 may have two inductors (e.g., one on each side, etc.), and may be modular. For example, the item sorting system machines 230 may each include sixteen expansion modules, where expansion modules may be defined as three two-sided columns next to one another for a total length of about 80 feet. The item sorting system machines 230 may reduce labor and capital costs associated with processing orders.

In some embodiments, the item sorting system 230 may replace other processes, such as manual processes. For example, manual induction of products from a tote to a sorter machine may be a bottleneck that is avoided by the systems and methods described herein. The item sorting system 230 may be a cross-belt shuttle sorter that sorts singulated products into containers or totes. Item sorting systems 230 may be capable of sorting at a rate of 2,100 units per hour or more. Certain item sorting systems 230 may be configured to handle items of up to twenty pounds, or more in some instances, with dimensions of about 18"× 14"×8" or greater, which may cover almost all products at the fulfillment center 200. The item sorting systems 230 may operate as a high-speed, high-destination sort solution that intakes items or packages and sorts them into containers using a shuttle that travels vertically and horizontally inside the machine (or outside in some instances).

Individual item sorting system machines may be item sorting systems, and may include a number of, such as two or more, modular sorting machines coupled in series, or otherwise adjacent to each other and connected. The modular sorting machines may include a first modular sorting machine. The modular sorting machines may be configured to singulate items from a tote comprising a plurality of items into a plurality of flexible containers (e.g. induct individual items from a container that has multiple items, and place the inducted items into the appropriate flexible container, where flexible containers are associated with multi-item orders. The tote from which items are inducted may be associated with the individual item sorting system machine (e.g., the modular sorting machines that form the individual item sorting system machine, etc.). In some embodiments, item sorting systems or individual item sorting machines may be configured to induct and sort packages based at least in part on a destination of the respective packages. Destinations may be internal destinations within a fulfillment center, external destinations to geographic regions or addresses, or other destination types.

Accordingly, in some embodiments, item sorting systems may be arranged in rows and may receive assigned totes from a routing sorter, thereby streamlining fulfillment center operation and reducing labor and space costs. The item sorting systems may process totes for multi-order sortation and consolidation. As a result, there may no longer be a need to singulate and send items to a wall for manual extraction, because each tote may be assigned to a particular item sorting system machine. Induct stations can be replaced with item sorting system machines.

In another embodiment, pickers may pick items directly to a segmented belt conveyor at a station that may be near an item sorting system machine. Other nearby pick stations may also pick items directly to conveyance for the same item sorting system machine. Picked items being transported to a single item sorting system machine may merge together to be inducted into their unique item sorting system machine, where multi-item orders may be consolidated and sent to packing.

Embodiments of the disclosure include automated package loading systems. The automated package loading systems may be used to aggregate packages (e.g., in conjunction with a shipping sorter 270, etc.) and/or to aggregate items (e.g., in conjunction with an item sorting system 230, etc.). Embodiments may optimize loading of containers based at least in part on computer vision analysis of container contents. Certain embodiments may improve processing speed and/or throughput of fulfillment centers. Certain embodiments may improve performance of mechanical equipment for sortation and/or consolidation of items for multi-item orders. While described in the context of online orders, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 3:
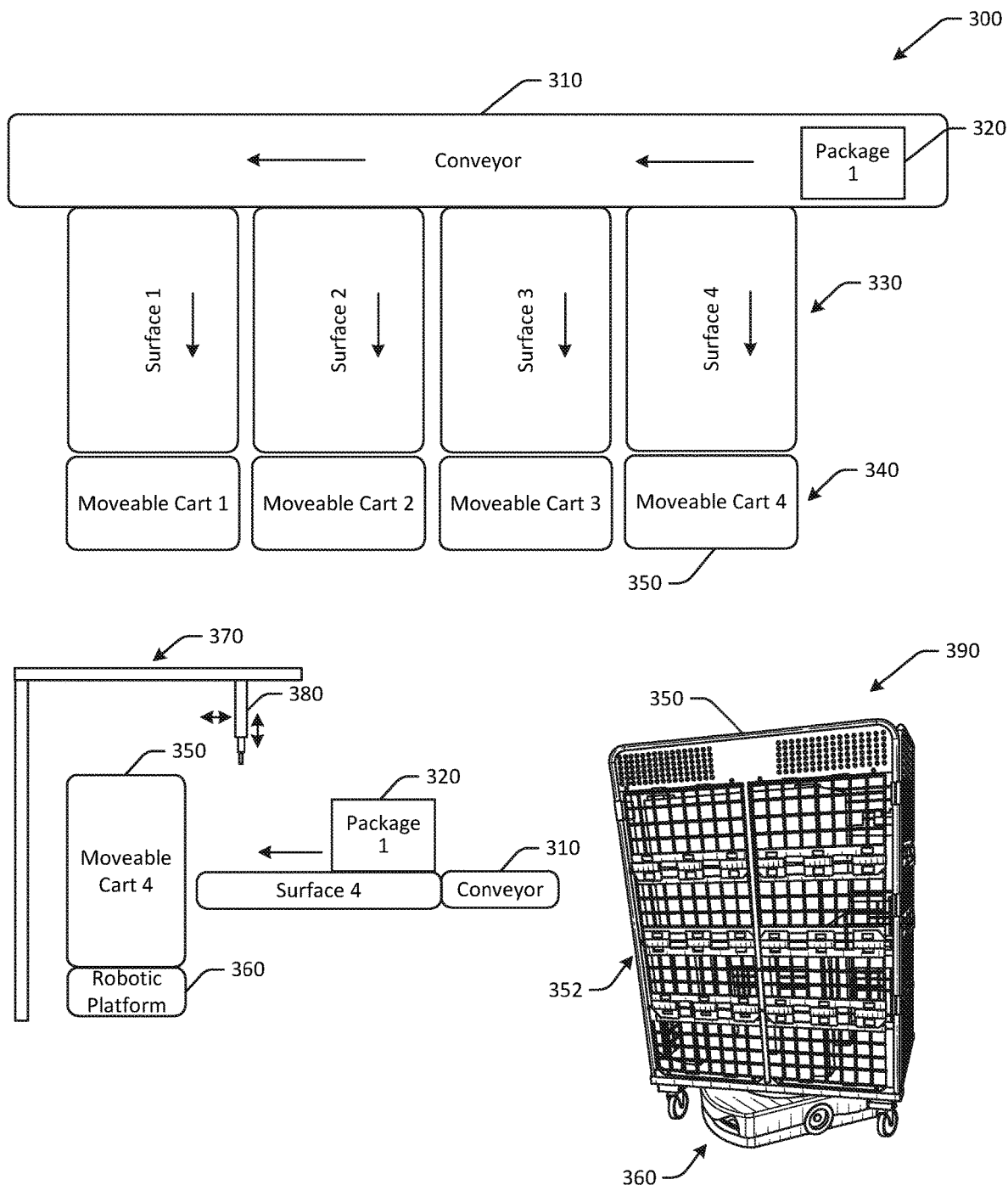
FIG. 3 is a schematic illustration of an automated package loading system in accordance with one or more embodiments of the disclosure.

FIG. 3 is a schematic illustration of an automated package loading system 300 in accordance with one or more embodiments of the disclosure. Other embodiments may include additional or fewer components. The illustration of FIG. 3 is not to scale, and may not be illustrated to scale with respect to other figures. The automated package loading system illustrated in FIG. 3 may be the automated package loading system discussed with respect to FIGS. 1-2.

In FIG. 3, a conveyor 310 may be used to transport packages 320. The packages 320 may be diverted onto one or more surfaces 330 to await placement into different corresponding moveable carts 340. The moveable carts 340 may include a first cart 350. In some instances, the conveyor 310 may be elevated with respect to the moveable carts 340. Each of the moveable carts 340 may be disposed at an end, such as a lower end, of a corresponding surface 330. The surfaces 330 may be optionally angled, such as at an angle of 25 degrees or 35 degrees, or another angle, with respect to horizontal. The surfaces 330 may be associated with different destinations, and the packages intended for the respective destinations may be diverted down the corresponding surfaces 330. Although depicted as having surfaces 330 on one side of the conveyor 310, other embodiments may include surfaces 330 and moveable carts 340 on both sides of the conveyor 310. The packages 320 may be diverted manually or using arms or bars that are automatically controlled.

As depicted in a side schematic view, an automated package loading system 370 may be positioned adjacent to the first cart 350. The automated package loading system 370 may include a robotic manipulator 380 that is configured to grasp packages from the corresponding surface 330 and to move the package into the first cart 350. The robotic manipulator 380 may include a linear actuator and/or telescoping arm with an end of arm tool that is used to grasp packages of different shapes, sizes, weights, and so forth. The robotic manipulator 380 may have three degrees of freedom. For example, the robotic manipulator 380 may be configured to move the X-, Y-, and Z-axis directions. In some embodiments, the robotic manipulator 380 may not be able to rotate along a central axis of the actuator or telescoping arm, so as to simplify hardware. The robotic manipulator 380 may be coupled to a support that is coupled to a floor of the facility, or a support that is coupled to a moveable base, or to another type of support. If the robotic manipulator 380 is coupled to a moveable support instead of a permanent fixture, the robotic manipulator 380 may be used to service different moveable carts by repositioning the robotic manipulator 380. The robotic manipulator 380 may be configured to access the first cart 350 from a topside, or from above, without requiring the doors of the first cart to be opened, thereby further simplifying the loading process.

The automated package loading system 370 may include a robotic platform 360 disposed at least partially under the first cart 350. The robotic platform 360 may be part of an autonomous robot. The robotic platform 360 may be configured to rotate the first cart 350 in different directions. Because the robotic platform 360 can rotate the first cart 350, rotational ability is not needed at the robotic manipulator 380. The robotic platform 360 may be disposed under an individual container. Different robotic platforms may be used for different containers.

As depicted in isolated view 390, the first cart 350 may have doors 352 that can open by swinging outwards. Because the robotic manipulator 380 can access the first cart 350 from above or from a topside, the doors 352 can remain closed during loading. The robotic manipulator 380 may be a moveable robotic manipulator that can be moveably positioned adjacent to different carts.

The automated package loading system 370 may be in communication with one or more sensors, such as cameras, used to image the contents of the first cart 350. The image data may be used to determine positioning for a package, such as the first package 320 inside the first cart 350. The package may be positioned in the predetermined position via movement of the robotic manipulator 380 after the package is grasped, and rotation of the first cart 350 via the robotic platform 360. The automated package loading system 370 may therefore utilize synchronized motion between the robotic manipulator 380 and the robotic platform 360 to place packages into the first cart 350.

The automated package loading system 370 may therefore optionally include a first cart having a first door, and a second cart having a second door. The automated package loading system 370 may include an autonomous robot having the robotic platform 360, where the robotic platform 360 may be configured to rotate carts from a first orientation to a second orientation. The robotic platform 360 may be configured to rotate carts at least 180 degrees. The automated package loading system 370 may include the robotic manipulator 380 that has a linear actuator and an end of arm tool, the robotic manipulator configured to (i) retrieve a first package from a first surface and to position the first package inside the first cart at a first predetermined position without opening the first door, and (ii) retrieve a second package from a second surface and to position the second package inside the second cart at a second predetermined position without opening the second door. The robotic manipulator 380 accesses carts from a top side. In some embodiments, the robotic manipulator 380 has no more than three degrees of freedom. The automated package loading system 370 may include, or may be in communication with, a first camera configured to image an interior of the first cart, and a second camera configured to image an interior of the second cart.

Figure 4:
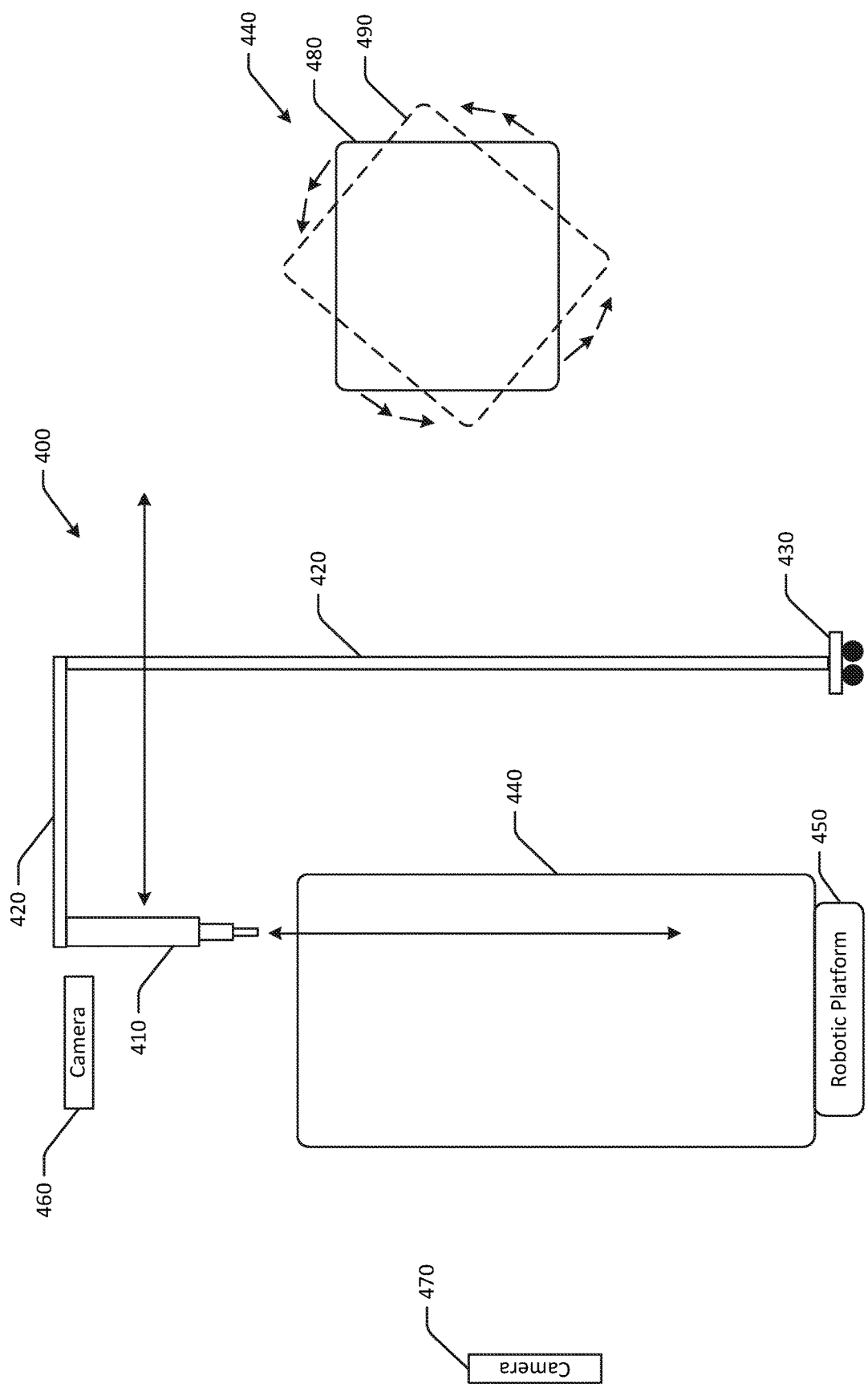
FIG. 4 is a schematic illustration of an automated package loading system and rotatable robotic platform in accordance with one or more embodiments of the disclosure.

FIG. 4 is a schematic illustration of an automated package loading system 400 and a rotatable robotic platform 450 in accordance with one or more embodiments of the disclosure. Other embodiments may include additional or fewer components. The illustration of FIG. 4 may not be to scale, and may not be illustrated to scale with respect to other figures. The automated package loading system illustrated in FIG. 4 may be the same automated package loading system discussed with respect to FIGS. 1-3.

In FIG. 4, the automated package loading system 400 may include a robotic manipulator 410 that is coupled to a moveable support 420. The moveable support 420 may include an overhead member that is configured to rotate about a vertical support. The moveable support 420 may include a base 430 that can be pushed, pulled, or otherwise moved, so as to position the robotic manipulator 410 adjacent to different carts, such that the robotic manipulator 410 can be used to load packages into different carts or containers as needed.

The automated package loading system 400 may include, or may otherwise be in communication with, one or more sensors, such as an overhead camera 460 and a side imaging camera 470. Other embodiments may use different types of sensors, such as LIDAR, depth sensors, and the like. The overhead camera 460 and the side imaging camera 470 may be used to image contents of a container 440. For example, the overhead camera 460 may be used to capture images of a top view of contents in the container 440, and the side imaging camera 470 may be used to capture images of a side view of the contents in the container 440. The image data (or other sensor data) may be used to determine optimal placement or positioning of subsequent packages in the container 440.

The container 440 may be rotated using a robotic platform 450. The robotic platform 450 may be part of an autonomous robot used to transport the container 440 in some embodiments. As depicted in top view in FIG. 4, the container 440 may be rotated from a first orientation 480 to a second orientation 490 via the robotic platform 450. In some embodiments, the robotic platform 450 may be configured to rotate the container 440 in either direction about 180 degrees. The robotic platform 450 may be configured to elevate or lift the container 440 prior to rotating the container 440. The robotic platform 450 may be configured to rotate the container 440 while the robotic manipulator is transporting a package from a surface to the container 440, so as to minimize package loading times.

The automated package loading system 400 may therefore include, in an embodiment, the robotic platform 450 configured to elevate and rotate the container 440 to a predetermined orientation, and the robotic manipulator 410 configured to retrieve a first package from a surface and to position the first package inside the container at a predetermined position. The robotic manipulator 410 may access the container from a top of the container. The robotic manipulator 410 may have no more than three degrees of freedom. In some instances, the robotic manipulator 410 may be a telescoping linear actuator having an end of arm tool configured to grasp packages of different sizes and shapes. The robotic manipulator 410 may be mounted to a floor surface and may configured to access a plurality of containers. In other embodiments, the robotic manipulator 410 may be a moveable robotic manipulator that can be dynamically positioned adjacent to different containers. The automated package loading system 400 may include one or more sensors, such as a camera, configured to image an interior of the container. The automated package loading system 400 may include a controller configured to determine a predetermined orientation to which the container 440 is to be rotated based at least in part on data from the sensor, and to determine a predetermined position for a package to be placed based at least in part on data from the sensor. The robotic manipulator 410 may be a moveable robotic manipulator that can be moveably positioned adjacent to the first cart and the second cart, such as via movement of the base 430.

Figure 5:
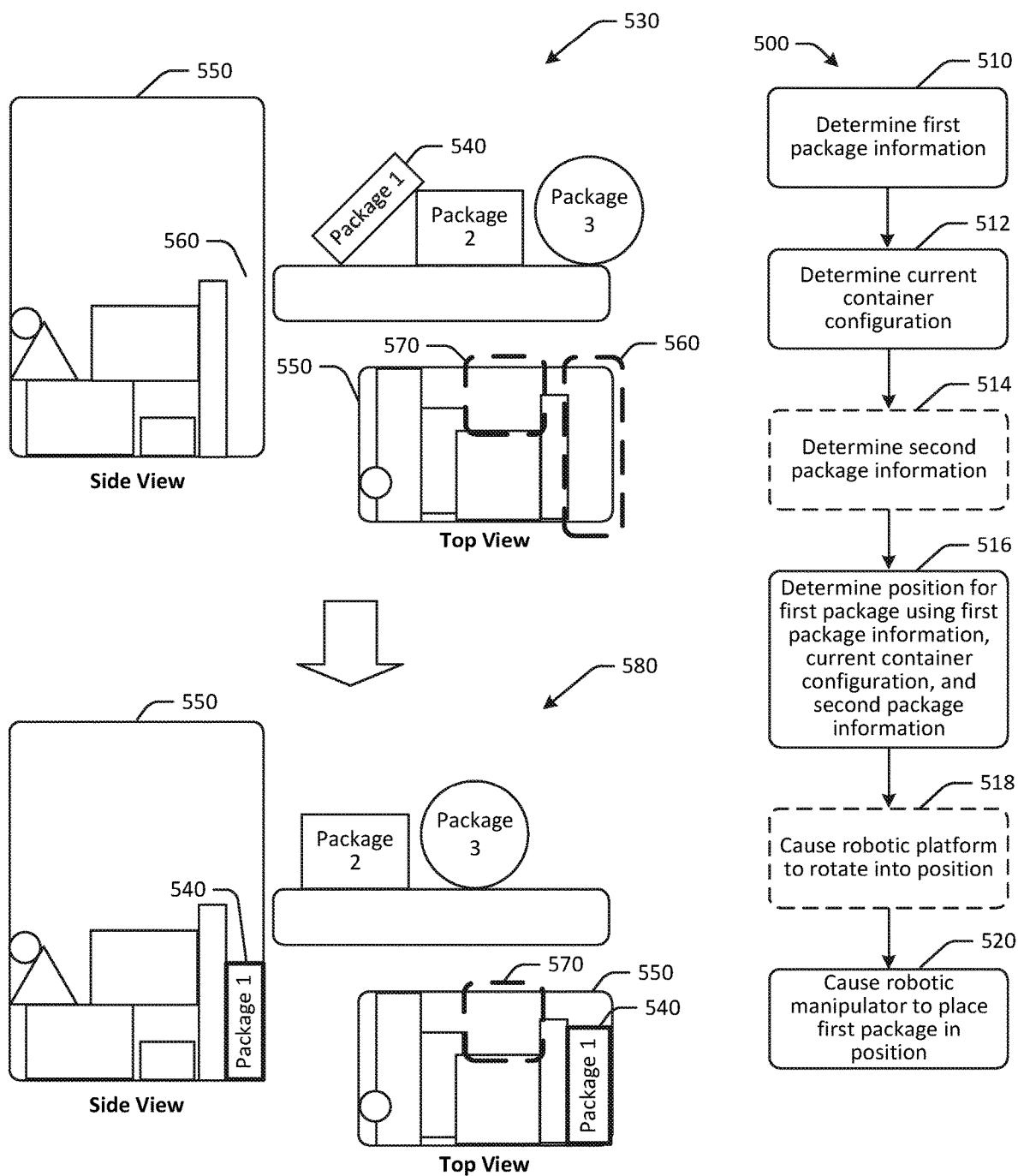
FIG. 5 is a schematic illustration of an automated package loading system during a loading process and an example process flow in accordance with one or more embodiments of the disclosure.

FIG. 5 is a schematic illustration of an automated package loading system during a loading process and an example process flow in accordance with one or more embodiments of the disclosure. Other embodiments may include additional or fewer components. The illustration of FIG. 5 may not be to scale, and may not be illustrated to scale with respect to other figures. The automated package loading system illustrated in FIG. 5 may be the same automated package loading system discussed with respect to FIGS. 1-4. The operations of the process flow may be performed in a different order than that depicted in the example of FIG. 5, and some or all of the operations may be performed at least partially concurrently.

An example process flow 500 may be executed by a controller in communication with the automated package loading system. At block 510, first package information may be determined. For example, the automated package loading system is depicted at a first point in time 530. At the first point in time 530, packages may be queued for loading into a container 550. The packages may include a first package 540 (labeled Package 1 in FIG. 5). The packages may be moved from a surface, such as a conveyor, into the container 550 using a robotic manipulator, as discussed with respect to FIGS. 1-4. To determine where the first package is to be positioned in the container 550, the automated package loading system may determine first package information of the first package, such as size information, weight information, shape or geometry information, and the like. The first package information may be determined using one or more sensors, such as a barcode scanner, a camera, or another type of sensor configured to image or scan the first package 540.

At block 512, a current container configuration may be determined. For example, the automated package loading system may use data from one or more sensors, such as cameras, depth sensors, or other sensors, that indicates a current configuration or arrangement of packages in the container 550. In the example of FIG. 5 at the first point in time 530, the current container configuration may indicate an arrangement of packages in the container 550 from a top view and/or a side view.

At optional block 514, second package information may be determined. For example, the automated package loading system may determine second package information for a subsequent package (e.g., Package 2 or Package 3 in FIG. 5) that is to be placed into the container 550. This may allow for improved optimization of package placement in the container, as subsequent package size and geometry may be taken into consideration when determining a position for the first package. The second package information may be determined using one or more sensors, such as a barcode scanner, a camera, or another type of sensor configured to image or scan the second package.

At block 516, a position for the first package may be determined using the first package information, the current container configuration, and the optional second package information. For example, the automated package loading system may determine a position for the first package based at least in part on available spaces in the container 550. The automated package loading system may determine that a first open position 560 and a second open position 570 can accommodate the first package. The automated package loading system may determine that the first package is to be positioned in the first open space 560 based at least in part on the first package information, the current container configuration, and the second package information. For example, the automated package loading system may determine that the second open space 570 should be reserved for the second package or the third package.

In some embodiments, the automated package loading system may determine a size and geometry of the first package, and determine a size and geometry of another package on the surface. The first predetermined position for the first package can be determined based at least in part on (i) data from the first camera (e.g., the current container configuration, etc.), (ii) the size and geometry of the first package, and (iii) the size and geometry of the second package.

At optional block 518, the automated package loading system may cause the robotic platform to rotate the container 550 into position, such that the container 550 can receive the first package from a robotic manipulator in the first open position 560. Some embodiments may not require rotation of the container, such as in instances where the container is already in the desired orientation.

At block 520, which may occur at the same time, or at least partially at the same time, as block 516, the automated package loading system may cause the robotic manipulator to grasp the first package and to place the first package in the first open position 560.

In some embodiments, the automated package loading system may determine a surface of the first package that should be used to grasp the package using the robotic manipulator. For example, based at least in part on image data of a package, an orientation of the package may be determined. The orientation may be analyzed to determine which surface(s) should be used to grasp the package when the robotic manipulator moves the end of arm tool into position adjacent to the package. The surface(s) may be selected based at least in part on surface area, surface contour, accessibility and/or positioning of the end of arm tool, and/or other factors.

Accordingly, at a second point in time 580, the first open position 560 may be occupied by the first package 540, and the second open position 570 may be used for a subsequent package. The movement of the robotic manipulator and the rotation of the robotic platform at the same time may provide a synchronized, and sometimes choreographed, set of movements that allows for loading of packages in reduced times while increasing optimization of container fill rates.

The automated package loading system may therefore include a controller configured to: determine a predetermined orientation for a first cart based at least in part on data from a first camera, cause an autonomous robot to rotate the first cart to the predetermined orientation, determine a first predetermined position for the first package based at least in part on data from the first camera, and cause the robotic manipulator to position the first package at the predetermined position inside the first cart.

Figure 6:
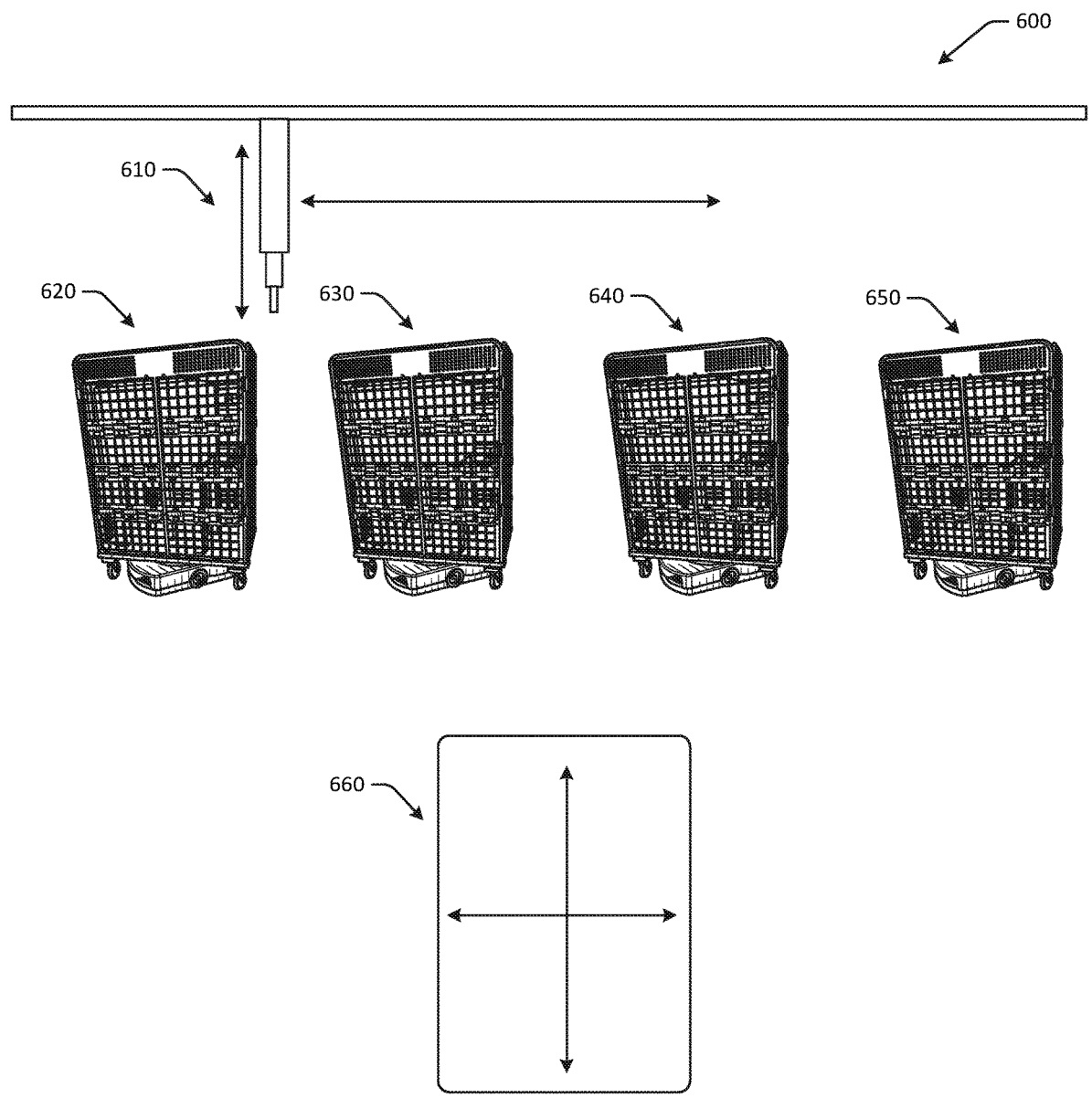
FIG. 6 is a schematic illustration of an overhead automated package loading system in accordance with one or more embodiments of the disclosure.

FIG. 6 is a schematic illustration of an overhead automated package loading system in accordance with one or more embodiments of the disclosure. Other embodiments may include additional or fewer components. The illustration of FIG. 6 is not to scale, and may not be illustrated to scale with respect to other figures. The automated package loading system illustrated in FIG. 6 may include components of the automated package loading systems discussed with respect to FIGS. 1-5.

In FIG. 6, the overhead automated package loading system may include an overhead set of rails or tracks 600 that can be used to move a robotic manipulator 610 into position over a number of containers that may not necessarily be adjacent to each other. For example, the overhead set of rails or tracks 600 may provide access to a plurality of containers in a line. In some embodiments, the robotic manipulator 610 may move along the tracks 600 to access the different containers. For example, the robotic manipulator 610 may slide along the tracks 600 to place packages into a first container 620, a second container 630, a third container 640, a fourth container 650, and so forth. The robotic manipulator 610 may be configured to access interiors of the respective containers, as well as nearby surfaces from which packages can be retrieved. The robotic manipulator 610 may be configured to move vertically (e.g., up and down along the page, etc.), laterally (e.g., left and right along the page, etc.), and back-and-forth (e.g., into and out of the page, etc.) so as to retrieve packages that are to be deposited into a container, and to place the package in a certain position in the container. As depicted in top view 660 of a container, the robotic manipulator 610 may move along an X-axis and Y-axis, as well as a Z-axis into the page, to position packages in containers. The tracks 600 may be linear and may provide access to side-by-side lines of containers. For example, if another set of four containers were arranged adjacent to the containers depicted in FIG. 6, the tracks 600 may include a path for the robotic manipulator 610 to access more than one line or row of containers.

Accordingly, in some embodiments, the robotic manipulator 610 may be an overhead robotic manipulator configured to access a plurality of containers, where the robotic manipulator 610 is configured to slide along one or more overhead tracks 600, such that the robotic manipulator 610 can access at least two containers adjacent to each other. In some embodiments, a boom or a beam arrangement, such as an overhead boom arrangement, may be used to access containers of different heights and/or to provide additional vertical range beyond that of a telescoping robotic manipulator.

FIGS. 7A-7D are schematic illustrations of an automated package loading system during various stages of package loading in accordance with one or more embodiments of the disclosure. Other embodiments may include additional or fewer components. The illustration of FIGS. 7A-7D are not to scale, and may not be illustrated to scale with respect to other figures. The automated package loading systems illustrated in FIGS. 7A-7D may include components of the automated package loading systems discussed with respect to FIGS. 1-6.

Figure 7A:
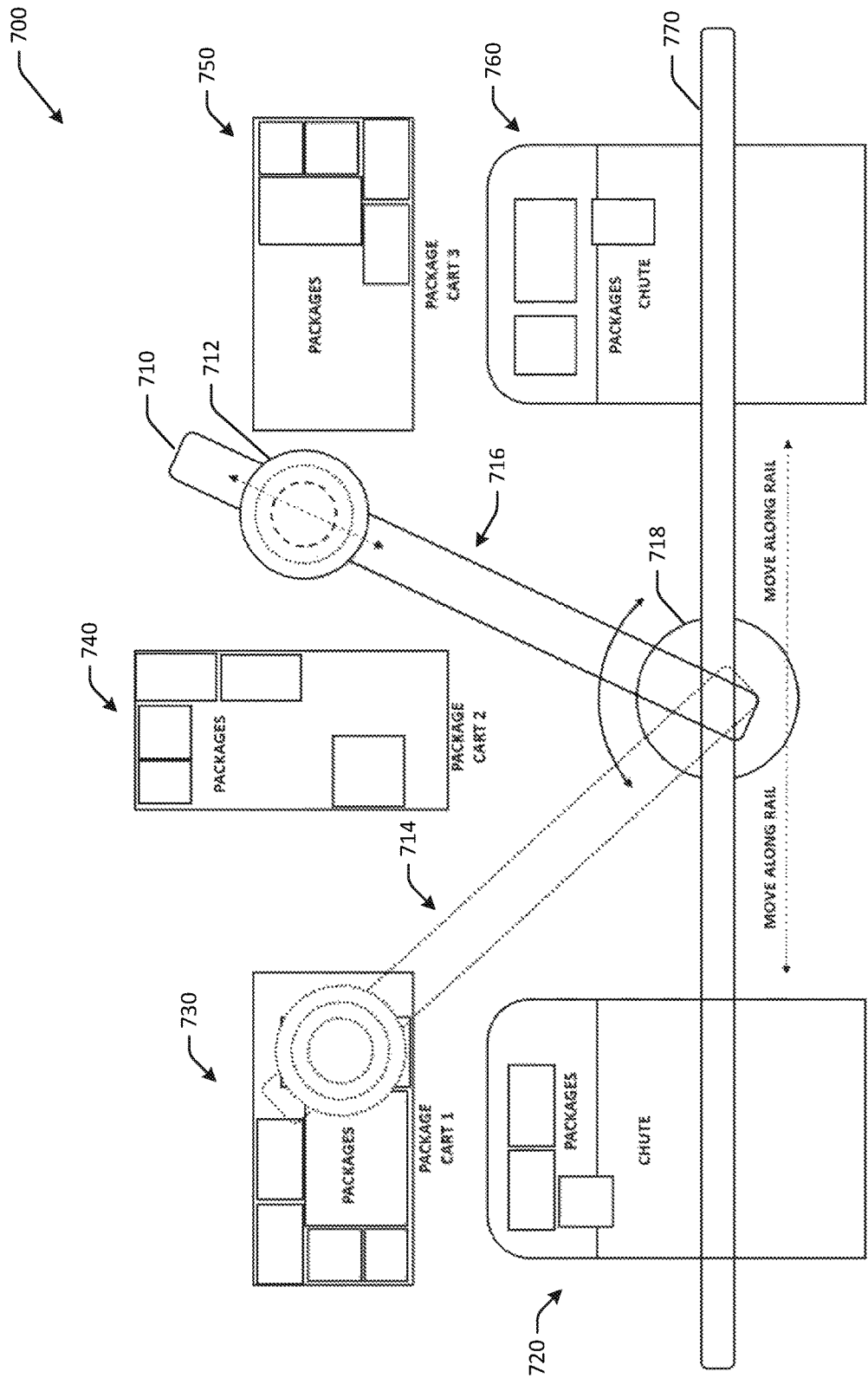
FIGS. 7A-7D are schematic illustrations of an automated package loading system during various stages of package loading in accordance with one or more embodiments of the disclosure.

In FIG. 7A, a top view of an automated package loading system 700 is depicted. The automated package loading system 700 may include a boom 710 that can rotate such that a robotic manipulator 712 can be used to load packages into more than one cart or container. The robotic manipulator 712 may be configured to move along the boom 710. The boom 710 may be a boom-on-rail system, and may be configured to move along a rail 770. The boom 710 may be coupled to the rail 770 at a joint 718 that allows for the boom 710 to rotate with respect to the rail 770. For example, the boom 710 may rotate from a first position 714 to a second position 716.

The robotic manipulator 712 may be configured to place packages from a first surface 720 and a second surface 760 into a first container 730, a second container 740, and a third container 750.

Figure 7B:
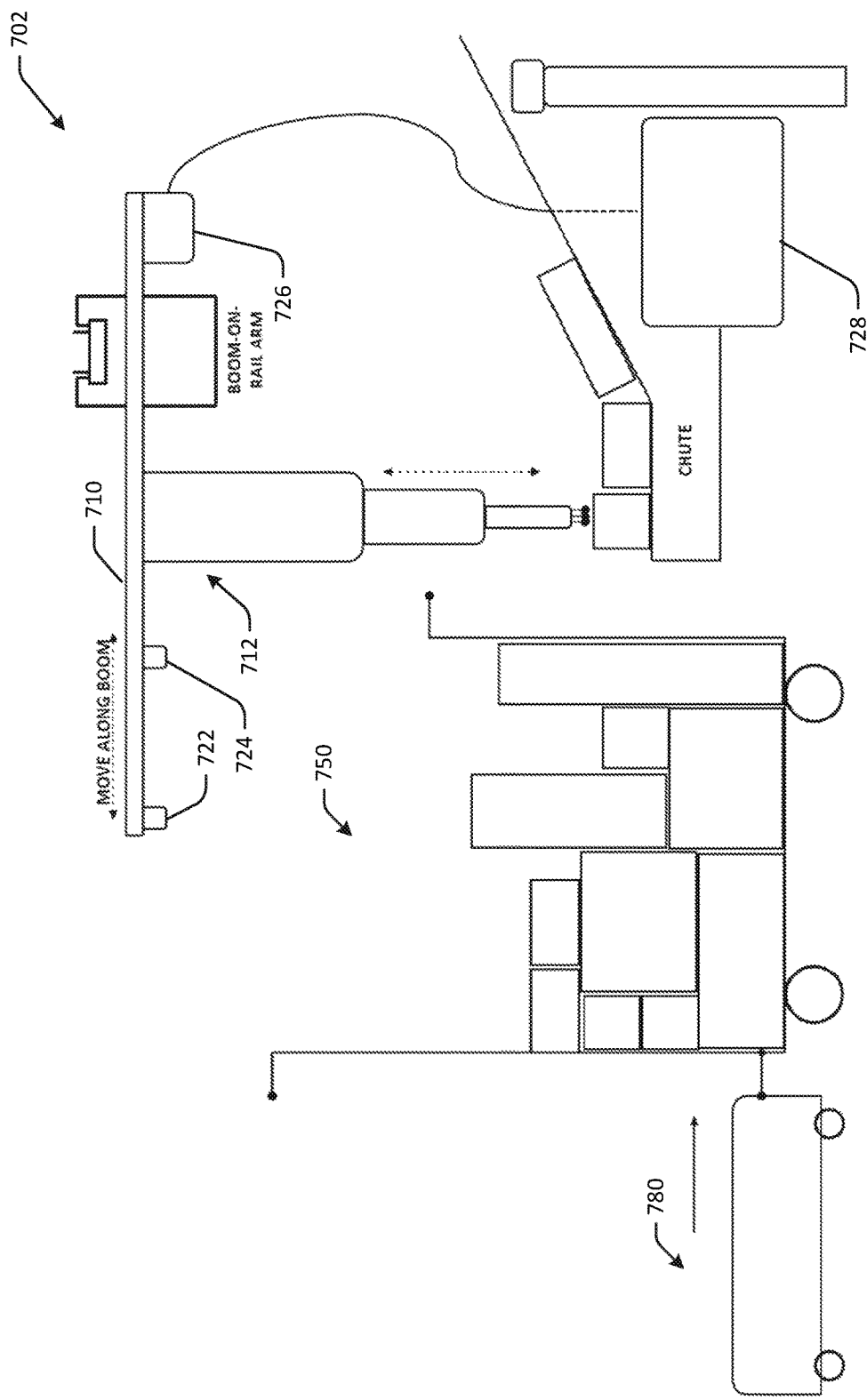

As depicted in side view 702 in FIG. 7B, the robotic manipulator 712 may move along the boom 710 to retrieve packages from a surface and place the packages into a container, such as the third container 750. A robotic platform may be coupled to an autonomous drive unit 780, which may be optionally used to rotate the third container 750. One or more sensors 722, 724, such as cameras, lidar, or other sensors, may be coupled to the boom 710. The automated package loading system 700 may include a vacuum pump 726 mounted on the boom 710 in some embodiments. A control module 728 may be coupled to the vacuum pump 726 via a wireless or wired connection. In FIG. 7B, the robotic manipulator 712 may be in a pick-up mode, or may be grasping a package from the surface.

Figure 7C:
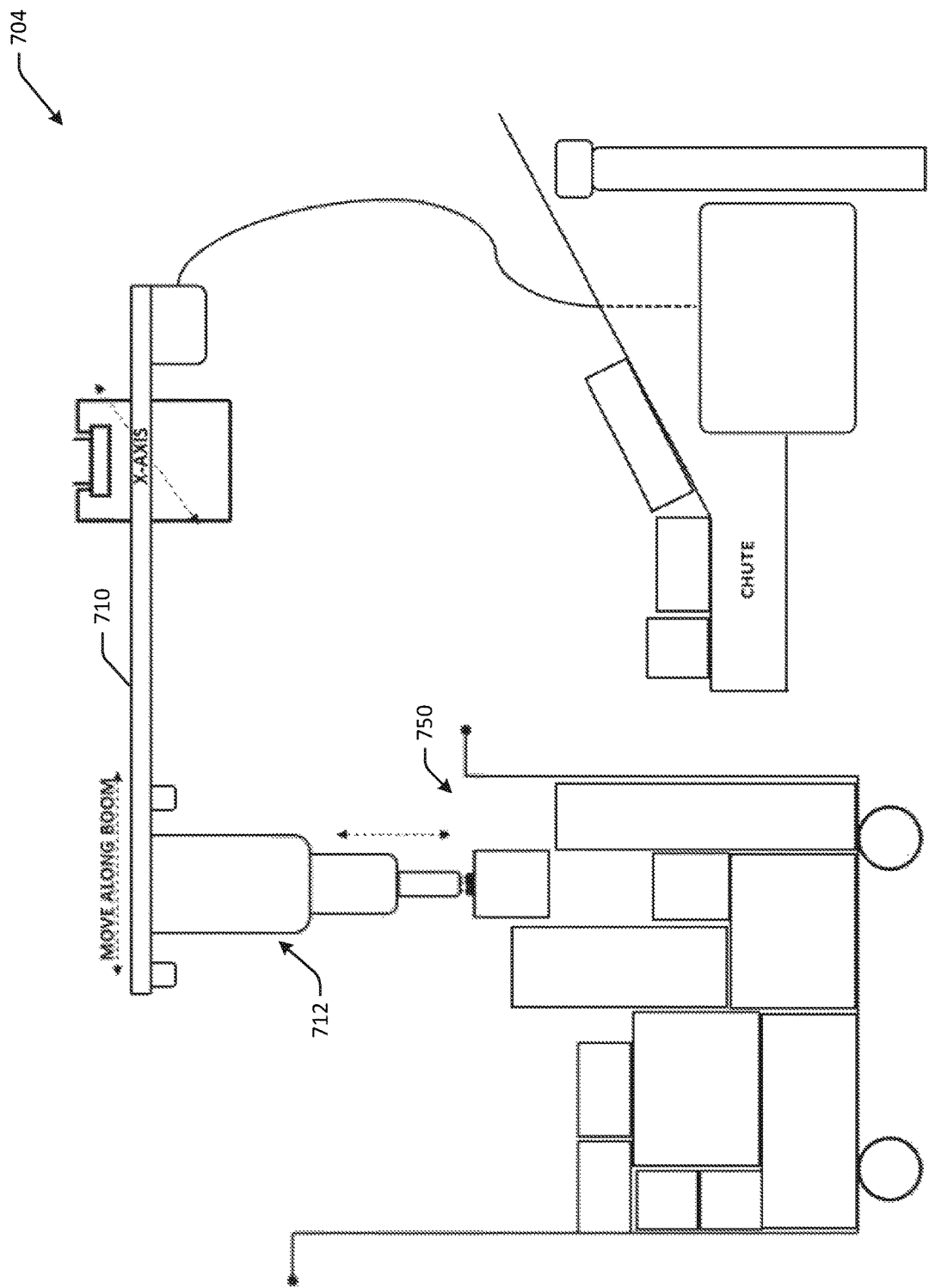
Figure 7D:
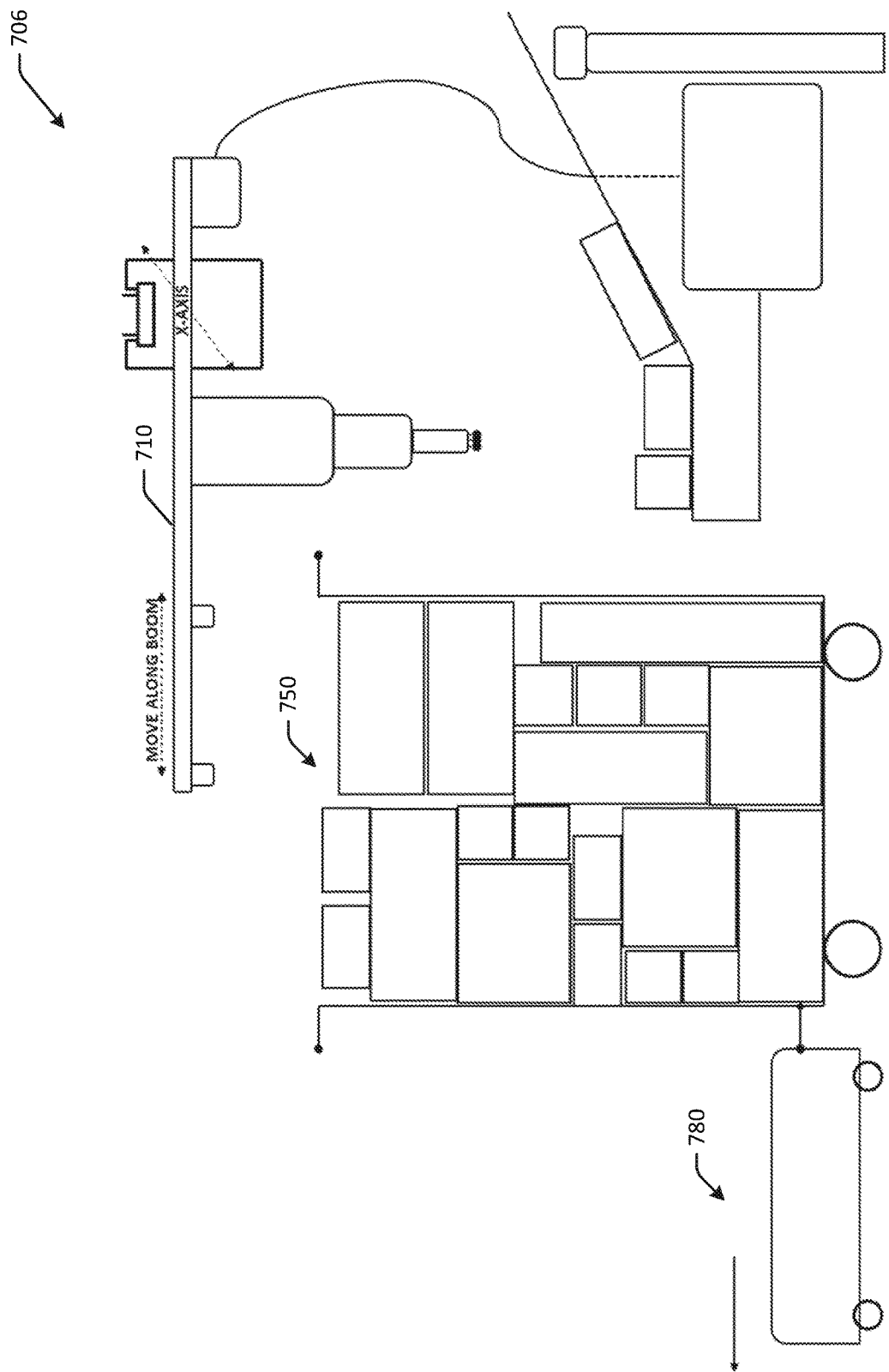

In FIG. 7C, the robotic manipulator 712 is depicted in side view 704 and may be used to transport the package from the surface and to position the package into the third container 750. In FIG. 7D, as the third container 750 is filled, the autonomous drive unit 780 may be used to transport the filled container to a downstream processing station and/or for transport.

Accordingly, in some embodiments, a combined telescopic arm and/or robotic manipulator, and an end of arm tool may be mounted on a cantilevered boom and may be configured to move along the cantilevered boom. The boom may be configured to swing or rotate along a fixed axis and may also be configured to slide along a rail. The robotic manipulator may be actuated, in one embodiment, with an electromechanical linear actuator powered by stepper or DC motors. The linear actuator can remain in position, during a de-energized state and maintain its position. High-gearing ratio motion systems can be used for high speed movement and control. The entire actuator may move or slide on the actuator arm through a linear/rack-pinion gearing and motor in some embodiments.

In one embodiment, operation of the automated package loading system 700 may include using an autonomous robot having a robotic platform to retrieve a container into which packages are to be loaded. A perception system, which may be a stereoscopic vision system that includes cameras, lidar, etc., may be used to create a high resolution 3D topology of the container top section profile as the container is filled. Based on packages available at surface(s), a controller may sequence an optimal order in which a robotic manipulator can service multiple chutes (if applicable). Once sequencing is complete, the robotic manipulator can locate itself in the sequence order and prepares for the pick process. The controller may ingest the topology/spatial map of the container top surface and may optionally combine it with the package information of a package to be picked (height, weight, length, etc.) to determine an optimal placement location in the container. The controller may cause the robotic manipulator and/or the autonomous drive unit, or both, to position themselves in the optimal X-Y coordinates, and then cause the robotic manipulator to hold/pick up the package (optionally with its stable edge facing down) and align itself to the correct orientation. The controller may cause the end of arm tool to move down into the container and drop the package, and retract after dropping the package. The perception system may then recreate the cart top profile topology, and the process restarts. If the robotic manipulator moves to another surface based on the sequencing plan, the process restarts for the new surface.

One or more operations of the methods, process flows, or use cases of FIGS. 1-7D may have been described above as being performed by a user device, or more specifically, by one or more program module(s), applications, or the like executing on a device. It should be appreciated, however, that any of the operations of the methods, process flows, or use cases of FIGS. 1-7D may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7D may be described in the context of the illustrative devices, it should be appreciated that such operations may be implemented in connection with numerous other device configurations.

The operations described and depicted in the illustrative methods, process flows, and use cases of FIGS. 1-7D may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7D may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
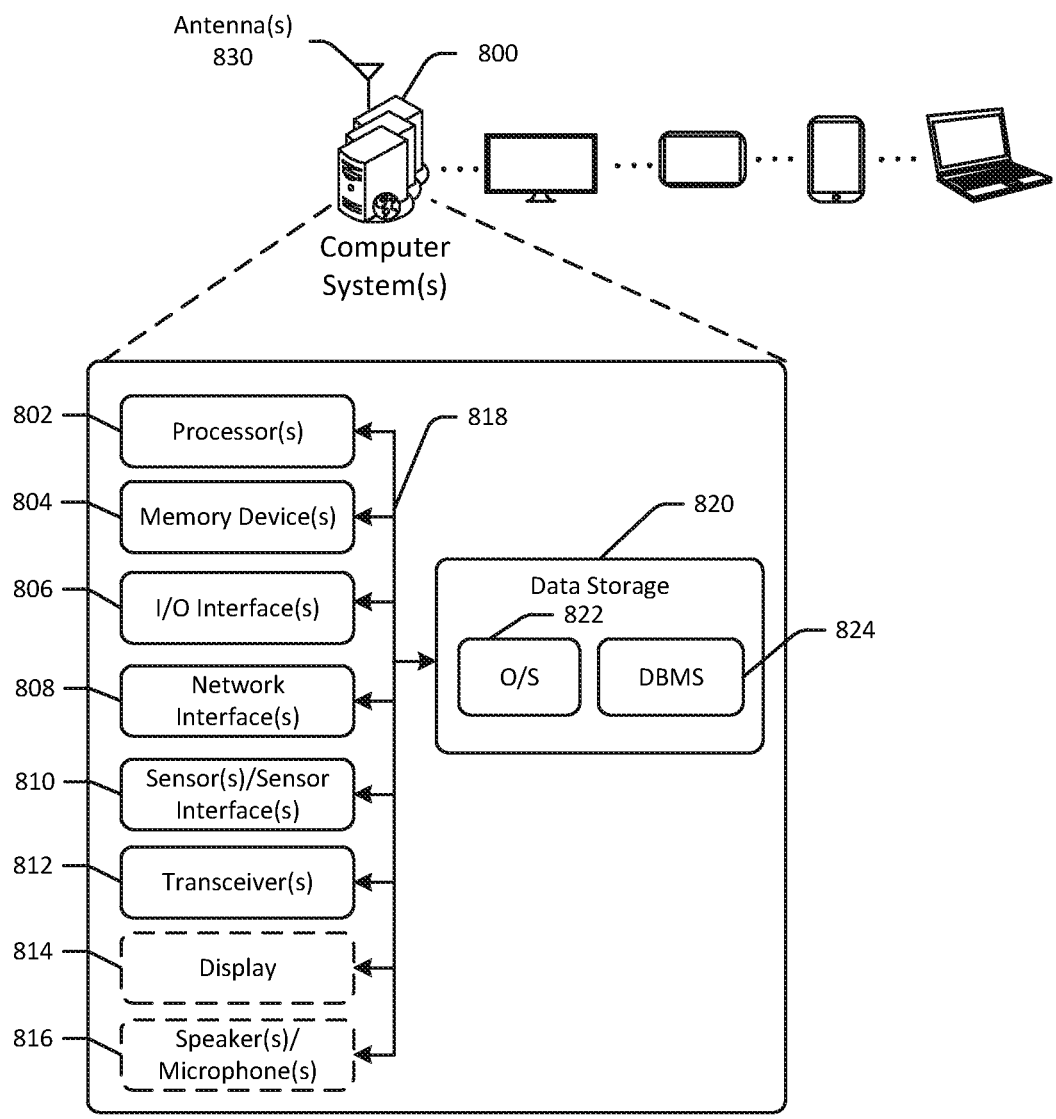
FIG. 8 schematically illustrates an example architecture of a computer system associated with an automated package loading system in accordance with one or more embodiments of the disclosure.

FIG. 8 is a schematic block diagram of one or more illustrative computer system(s) 800 in accordance with one or more example embodiments of the disclosure. The computer system(s) 800 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 800 may correspond to an illustrative device configuration for a computer system used in conjunction with the system(s) of FIGS. 1-7D.

The computer system(s) 800 may be configured to communicate with one or more servers, user devices, or the like. The computer system(s) 800 may be configured to cause the automated package loading system(s) to position items into one or more moveable carts.

The computer system(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display(s) 814, one or more optional microphone(s) 816, and data storage 820. The computer system(s) 800 may further include one or more bus(es) 818 that functionally couple various components of the computer system(s) 800. The computer system(s) 800 may further include one or more antenna(s) 830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the computer system(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the computer system(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the computer system(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute the computer-executable instructions loaded therein. For example, the processor(s) 802 may be configured to execute the computer-executable instructions of the various program module(s), applications, engines, or the like of the computer system(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 820, the O/S 822 may be loaded from the data storage 820 into the memory 804 and may provide an interface between other application software executing on the computer system(s) 800 and the hardware resources of the computer system(s) 800. More specifically, the O/S 822 may include a set of computer-executable instructions for managing the hardware resources of the computer system(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 800 is a mobile device, the DBMS 824 may be any suitable lightweight DBMS optimized for performance on a mobile device.

Referring now to other illustrative components of the computer system(s) 800, the input/output (I/O) interface(s) 806 may facilitate the receipt of input information by the computer system(s) 800 from one or more I/O devices as well as the output of information from the computer system(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(s) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 800 may further include one or more network interface(s) 808 via which the computer system(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(s) 830 may include any suitable type of antenna depending, for example, on the communications protocols used to transmit or receive signals via the antenna(s) 830. Non-limiting examples of suitable antennas may include directional antennas, non-directional antennas, dipole antennas, folded dipole antennas, patch antennas, multiple-input multiple-output (MIMO) antennas, or the like. The antenna(s) 830 may be communicatively coupled to one or more transceivers 812 or radio components to which or from which signals may be transmitted or received.

As previously described, the antenna(s) 830 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 830 may be configured to transmit or receive radio frequency signals within any suitable frequency range forming part of the unlicensed portion of the radio spectrum.

The antenna(s) 830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s) 830—transmitting or receiving radio frequency (RF) signals in the bandwidth and/or channels corresponding to the communications protocols utilized by the computer system(s) 800 to communicate with other devices. The transceiver(s) 812 may include hardware, software, and/or firmware for modulating, transmitting, or receiving—potentially in cooperation with any of antenna(s) 830—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computer system(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 814 may be configured to output light and/or render content. The optional speaker(s)/microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the computer system(s) 800 may include alternate and/or additional hardware, software, or firmware components beyond those described or depicted without departing from the scope of the disclosure. More particularly, it should be appreciated that software, firmware, or hardware components depicted as forming part of the computer system(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:
    a first cart having a first door;
    a second cart having a second door;
    an autonomous robot comprising a robotic platform, wherein the robotic platform is configured to rotate carts from a first orientation to a second orientation, and wherein the robotic platform is configured to rotate carts at least 180 degrees;
    a robotic manipulator comprising a linear actuator and an end of arm tool, the robotic manipulator configured to (i) retrieve a first package from a first surface and to position the first package inside the first cart at a first predetermined position without opening the first door, and (ii) retrieve a second package from a second surface and to position the second package inside the second cart at a second predetermined position without opening the second door, wherein the robotic platform is configured to rotate the first cart while the robotic manipulator is transporting the first package from the first surface to the first cart;
    a first camera configured to image an interior of the first cart;
    a second camera configured to image an interior of the second cart; and
    a controller configured to:
        determine a predetermined orientation for the first cart based at least in part on data from the first camera;
        cause the autonomous robot to rotate the first cart to the predetermined orientation;
        determine the first predetermined position for the first package based at least in part on data from the first camera;
        determine an orientation of the first package on the first surface;
        determine a first grasping surface of the first package based at least in part on the orientation of the first package on the first surface;
        cause the robotic manipulator to grasp the first package at the first grasping surface; and
        cause the robotic manipulator to position the first package at the predetermined position inside the first cart.

2. The system of claim 1, wherein the robotic manipulator is a moveable robotic manipulator that can be moveably positioned adjacent to the first cart and the second cart.

3. The system of claim 1, wherein the robotic manipulator has no more than three degrees of freedom.

4. The system of claim 1, wherein the controller is further configured to:
    determine a size and geometry of the first package; and
    determine a size and geometry of a third package on the first surface;
    wherein the first predetermined position for the first package is determined based at least in part on (i) data from the first camera, (ii) the size and geometry of the first package, and (iii) the size and geometry of the third package.

5. A system comprising:
    a robotic platform configured to elevate and rotate a container to a predetermined orientation;
    a robotic manipulator configured to retrieve a first package from a surface and to position the first package inside the container at a predetermined position, wherein the robotic platform is configured to rotate the container while the robotic manipulator is transporting the first package from the surface to the container;
    a sensor configured to image an interior of the container; and
    a controller configured to:
        determine the predetermined orientation of the container based at least in part on data from the sensor;
        determine the predetermined position based at least in part on data from the sensor;
        determine an orientation of the first package on the surface;
        determine a first grasping surface of the first package based at least in part on the orientation of the first package on the surface;
        cause the robotic manipulator to grasp the first package at the first grasping surface; and
        cause the robotic manipulator to position the first package at the predetermined position inside the container.

6. The system of claim 5, wherein the robotic manipulator is a telescoping linear actuator comprising an end of arm tool.

7. The system of claim 5, wherein the robotic manipulator is mounted to a floor surface and is configured to access a plurality of containers.

8. The system of claim 5, wherein the robotic manipulator is an overhead robotic manipulator configured to slide along one or more overhead tracks, such that the robotic manipulator can access at least two containers adjacent to each other, and at least two surfaces corresponding to at least two respective containers.

9. The system of claim 5, wherein the robotic platform is coupled to an autonomous robot that is configured to autonomously transport the container.

10. The system of claim 5, wherein the robotic manipulator accesses the container from a top of the container and has no more than three degrees of freedom, and wherein the robotic platform is configured to rotate the container at least 180 degrees.

11. The system of claim 5, wherein the controller is further configured to:
   determine a size of the first package;
   determine a size of a second package on the surface; and
   determine the predetermined position based at least in part the size of the first package and the size of the second package.

12. The system of claim 11, wherein the controller is further configured to:
   determine a geometry of the first package;
   determine a geometry of a second package on the surface; and
   determine the predetermined position based at least in part the size and geometry of the first package and the size and geometry of the second package.

13. The system of claim 5, wherein the robotic manipulator is a moveable robotic manipulator that can be dynamically positioned adjacent to different containers.

14. The system of claim 13, wherein the robotic manipulator is coupled to a rotatable boom, and wherein the robotic manipulator can slide linearly along the rotatable boom.

15. A system comprising:
   a robotic platform configured to elevate and rotate a container to a predetermined orientation;
   a robotic manipulator configured to retrieve a first package from a surface and to position the first package inside the container at a predetermined position, wherein the robotic manipulator accesses the container from a top of the container, and wherein the robotic platform is configured to rotate the container while the robotic manipulator is transporting the first package from the surface to the container;
   a sensor configured to image an interior of the container; and
   a controller configured to:
      determine the predetermined orientation of the container based at least in part on data from the sensor;
      determine the predetermined position based at least in part on data from the sensor;
      determine an orientation of the first package on the surface;
      determine a first grasping surface of the first package based at least in part on the orientation of the first package on the surface; and
      cause the robotic manipulator to grasp the first package at the first grasping surface.

16. The system of claim 15, wherein the controller is further configured to:
   determine a size and geometry of the first package;
   determine a size and geometry of a second package on the surface; and
   determine the predetermined position based at least in part the size and geometry of the first package and the size and geometry of the second package.

17. The system of claim 15, wherein the robotic manipulator is an overhead robotic manipulator configured to access a plurality of containers.

18. The system of claim 15, wherein the robotic platform is coupled to an autonomous robot that is configured to autonomously transport the container.

* * * * *